United States Patent [19]

Vanosdall

[11] Patent Number: 4,519,305
[45] Date of Patent: May 28, 1985

[54] VEGETABLE PEELER

[75] Inventor: Dennis L. Vanosdall, Galesburg, Ill.

[73] Assignee: Hawkeye Food Machinery, Inc., Galesburg, Ill.

[21] Appl. No.: 576,627

[22] Filed: Feb. 3, 1984

[51] Int. Cl.$^3$ .............................................. A23N 7/02
[52] U.S. Cl. ........................................ 99/625; 99/626; 99/629
[58] Field of Search .......... 99/518, 519, 585, 623–626, 99/628–630; 15/3.11, 3.13, 3.14, 3.2, 3.21; 134/65, 132–134, 1

[56] References Cited

U.S. PATENT DOCUMENTS

| | | | |
|---|---|---|---|
| 2,249,787 | 7/1941 | Savage. | |
| 3,745,914 | 7/1973 | Wallace | 99/630 |
| 3,811,000 | 5/1974 | Lazzarini | 426/483 |
| 3,854,395 | 12/1974 | Hirahara | 99/630 |
| 3,946,658 | 3/1976 | Smith | 99/627 |
| 4,062,985 | 12/1977 | Amstad | 426/483 |
| 4,132,162 | 1/1979 | Magnuson | 99/630 |
| 4,237,782 | 12/1980 | Bichel | 99/626 X |

OTHER PUBLICATIONS

Sales literature–A. K. Robins of Balt., Md. showing the "Magnuson Abrasive Magnupeeler", the Osborn Peeler and the Veg-A-Peel.

Sales literature–Vanmark Corp. of Creston, Iowa showing the Vanmark Peeler, Model 27.

Primary Examiner—Timothy F. Simone
Attorney, Agent, or Firm—Isaksen, Lathrop Esch, Hart & Clark

[57] ABSTRACT

A vegetable peeler for peeling large quantities of vegetables. The vegetable peeler has a frame on which a plurality of rollers are rotatably mounted in parallel relation to define a longitudinally extending, upwardly opening trough. A discharge auger is rotatably mounted on the frame and extends longitudinally within the trough from the discharge end thereof for a selected distance less than the entire length of the trough. The sides of the trough extend upwardly on either side of the auger at least as high as the longitudinal axis thereof. The auger is mounted on the frame by mounting means adapted to leave a portion of the trough between the auger and the intake end of the trough substantially unobstructed. As a consequence, the trough may receive an amount of vegetables placed therein for peeling, even if the amount is sufficiently large that the vegetables fill the trough at least as high as the longitudinal axis of the auger, without any interference to the free tumbling and other movement of the vegetables in the unobstructed portion of the trough. Auger rotating means are provided for rotating the auger at a selected speed about its longitudinal axis.

6 Claims, 5 Drawing Figures

U.S. Patent  May 28, 1985  Sheet 3 of 3  4,519,305
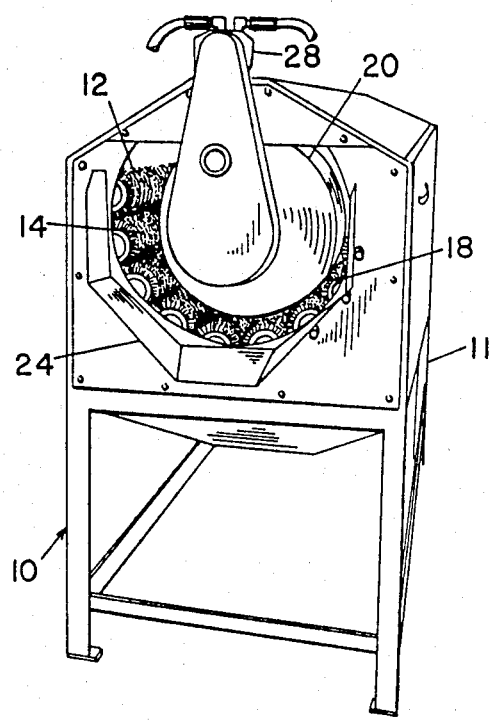
Fig 3
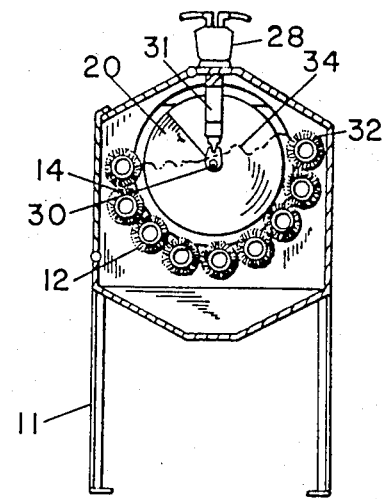
Fig 4
Fig 5
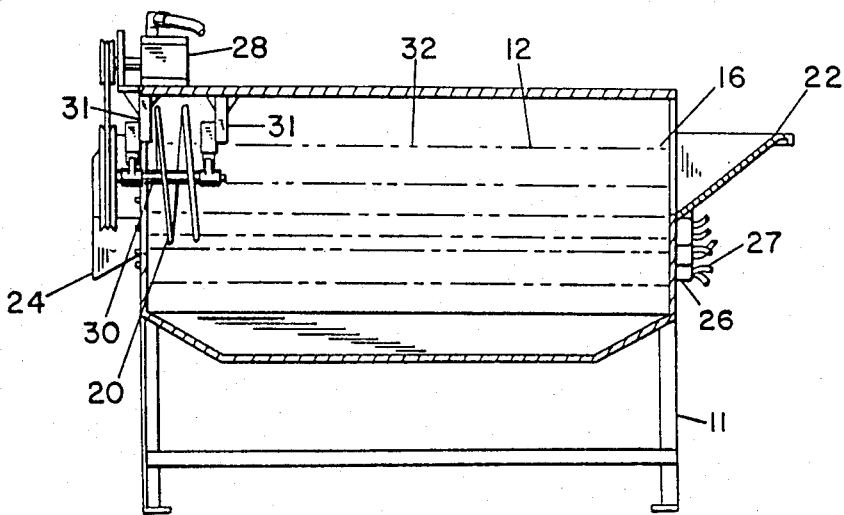

VEGETABLE PEELER

TECHNICAL FIELD

The present invention relates to machinery adapted for mass produced food processing in general and, in particular, to high-capacity vegetable peelers.

BACKGROUND OF ART

Those skilled in the art of food processing are cognizant of a variety of devices in which vegetables are exposed to an abrasive surface against which they move or which moves against them to peel the vegetable. One generally conventional feature in such peelers is the use of rotating rollers having an abrasive surface. The vegetables are allowed to traverse the length of a trough or drum defined by a plurality of such rollers, which turn to rub or abrade away the surface of the vegetable. Examples include Savage, U.S. Pat. No. 2,249,787; Wallace, U.S. Pat. No. 3,745,914; Lazzarini, U.S. Pat. No. 3,811,000; Smith, U.S. Pat. No. 3,946,658; Amstad, U.S. Pat. No. 4,062,985; and Magnuson, U.S. Pat. No. 4,132,162. Such peelers are available on the market. Examples include machinery available from A. K. Robins and Company, Incorporated, of Baltimore, Md. and identified thereby as the Magnupeeler, Veg-A-Peel Washer and Peeler, and the Osborn Multi-purpose U-brush Washer. Also similar are the Vanmark Peeler, Model 27, sold by the Vanmark Corporation of Creston, Iowa, and the Bichel/Starr Peeler sold by Ron Bichel and Associates, Inc. of Hustisford, Wis.

In some of the peelers referred to above, the trough of rollers is unobstructed throughout its length. Vegetables simply are dumped in at the intake end of the trough of rollers and migrate to the other end across the generally horizontal set of rollers. In some instances the rollers are made with radially extending bristles canted slightly toward the discharge end of the machine. As a consequence, when a potato or other vegetable impacts against the bristles, it receives a slight impulse or nudge tending to cause it to travel down the trough of rollers towards the discharge end of the machine. Some vegetable peelers are equipped with augers that run the length of the trough to move the vegetables down the trough and regulate the time it takes them to pass through the machine. Examples are the Magnupeeler and the Bichel/Starr Peeler referred to above. A similar structure is seen in Hirahara, U.S. Pat. No. 3,854,395. The Vanmark Peeler referred to above has no auger but instead regulates the discharge of vegetables from the trough of rollers by an adjustable gate that may be manipulated so as partially to block the discharge end of the machine.

An important characteristic of a vegetable-peeling machine is the amount of vegetables it can process in a given length of time. The five machines referred to above as being on the market all receive extensive use in the peeling of potatoes. The skins of the potatoes are commonly loosened by an initial steam treatment. The potatoes then are directed through a peeler, and the skins are removed thereby. Of the machines referred to above, the Osborn Peeler and the Veg-A-Peel are perhaps the simplist and are very similar to each other. Neither has an auger and both have an arrangement of rollers forming a longitudinally extending trough. In the industry, either of these machines is anticipated to be able to peel 12,000 pounds of steam-treated potatoes per hour.

The Vanmark machine is similar to the Osborn and Veg-A-Peel machines in that it has no auger and has rollers forming a trough shape. However, the Vanmark machine also has the gate referred to above capable of partially closing the discharge end with the effect of controlling the flow of potatoes through the machine and building the potatoes into a deeper mass within the machine. The alteration is mechanically simple but the effect is significant. The Vanmark machine is generally thought to be capable of peeling 25,000 pounds of steam-treated potatoes per hour.

The auger-equipped Bichel/Starr and Magnupeeler machines represent further departures from the basic trough of rollers. Each machine has a continuous auger shaft running the length of the trough. On this shaft is mounted an auger that extends inwardly from the discharge end. In the Bichel/Starr machine, the auger extends inwardly into the trough for only part of the trough's length. The auger serves to regulate flow through the machine in much the way that the adjustable gate of the Vanmark machine does. For the rest of the length of the trough, the auger shaft carries a helical ribbon of metal that is continuous with the outer rim of the auger, essentially being an extension of it. Both the auger and the ribbon are of a size such that they sweep the sides and bottom of the trough of rollers as the auger shaft turns. The helical ribbon of metal thus serves to agitate the mass of vegetables in the machine and to provide an additional mechanism to impel vegetables toward the discharge end. It is generally expected by those skilled in the art that the Bichel/Starr machine is capable of peeling 25,000 pounds of steam-treated potatoes per hour.

The auger of the Magnupeeler, in contrast to that of the Bichel/Starr machine, is continuous over the length of the rollers. Thus, whereas the auger of the Bichel/Starr machine terminates part way down the trough of rollers and the helical ribbon of metal continues, the auger of the Magnupeeler simply continues, to extend the entire length of the rollers. In addition, the rollers of the Magnupeeler are arranged to form a complete drum instead of a trough, which drum rotates as the individual rollers also rotate. The Magnupeeler is believed to be substantially similar to the vegetable peeler disclosed in the Magnuson patent referred to above. With its auger and entire rotating drum of turning rollers, the Magnuson device is mechanically more complicated than the other machines referred to. However, the Magnupeeler is expected in the industry to be able to peel 50,000 pounds of steam-treated potatoes an hour.

It will be appreciated that, although physical differences between the machines discussed above are apparent and differences in capacity are marked, it is not known precisely what aspects of each machine contribute in exactly what way to their production capacity. Small differences, such as the adjustable gate of the Vanmark machine, can apparently be responsible for significant differences in capacity. Those skilled in the art are not cognizant of a peeling machine of simple mechancal structure that exhibits the highest capacity.

BRIEF SUMMARY OF THE INVENTION

The present invention is summarized in that a vegetable peeler for peeling large quantities of vegetables includes a frame and a plurality of rollers rotatably attached to the frame in parallel relation to define a longitudinally extending, substantially horizontal, upwardly opening trough. The trough has sides, an intake end at which vegetables may be introduced into the trough, and a discharge end from which peeled vegetables may be discharged from the trough. Roller rotating means are provided for rotating the rollers about their longitudinal axes. A discharge auger extends longitudinally within the trough from the discharge end thereof parallel to the longitudinal axes of the rollers for a selected distance less than the entire length of the trough, the sides of the trough extending upwardly on either side of the auger at least as high as the longitudinal axis thereof. Mounting means are provided for rotatably mounting the auger on the frame, the mounting means being adapted to leave a portion of the trough between the auger and the intake end substantially unobstructed whereby the trough may receive an amount of vegetables placed therein for peeling, even if the amount is sufficiently large that the vegetables fill the trough at least as high as the longitudinal axis of the auger, without any interference to the free tumbling and other movement of the vegetables in the unobstructed portion of the trough.

A primary object of the invention is to provide a vegetable peeler suitable for incorporation in a food processing production line.

A second object of the invention is to provide such a peeler having a large capacity without resort to mechanically complicated machinery.

A further object of the invention is to provide such a peeler having a capacity increased over that of conventional peelers within substantially the same length as that of conventional peelers.

Other objects, features, and advantages of the invention will be apparent from the following detailed description taken in conjunction with the accompanying drawings showing a preferred embodiment of a vegetable peeler exemplifying the principles of the invention.

BRIEF DESCRIPTION OF THE DRAWINGS

FIG. 3 is a perspective view of the discharge end of the vegetable peeler of FIG. 1.

FIG. 4 is a lateral cross sectional view of the vegetable peeler of FIG. 1 taken midway down the length of the vegetable peeler and facing the discharge end thereof.

FIG. 5 is a longitudinal cross sectional view of the vegetable peeler of FIG. 1, the section being a vertical section taken along the longitudinal axis of the auger, with the rollers shown schematically in phantom.

DETAILED DESCRIPTION OF THE PREFERRED EMBODIMENT

Figure 1:
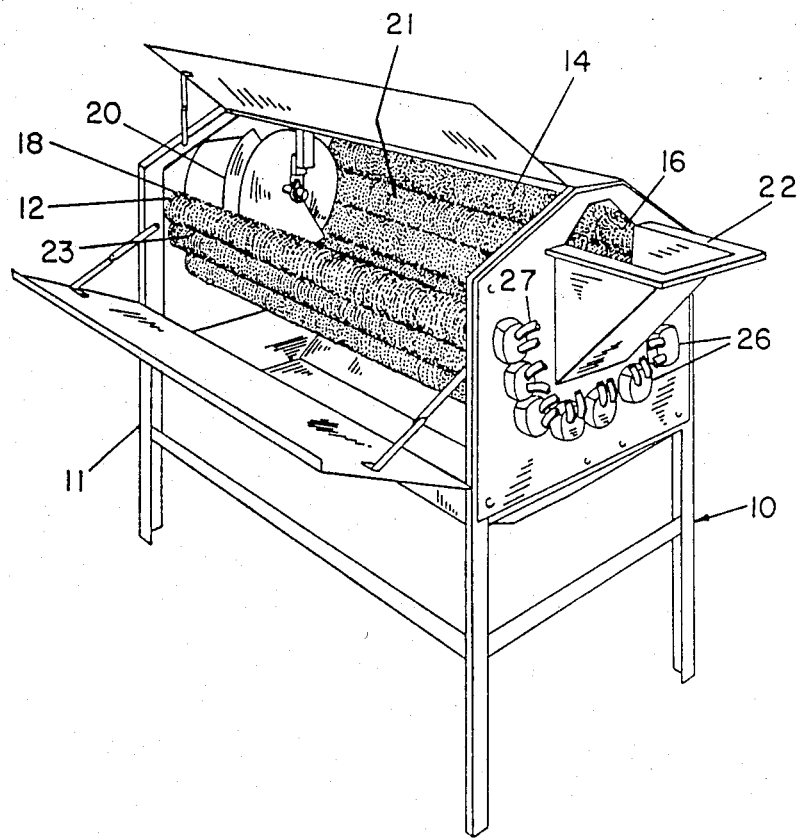
FIG. 1 is a perspective view of the vegetable peeler of the invention from the intake end with protective covers of the vegetable peeler open to reveal the rollers and auger thereof.
Figure 2:
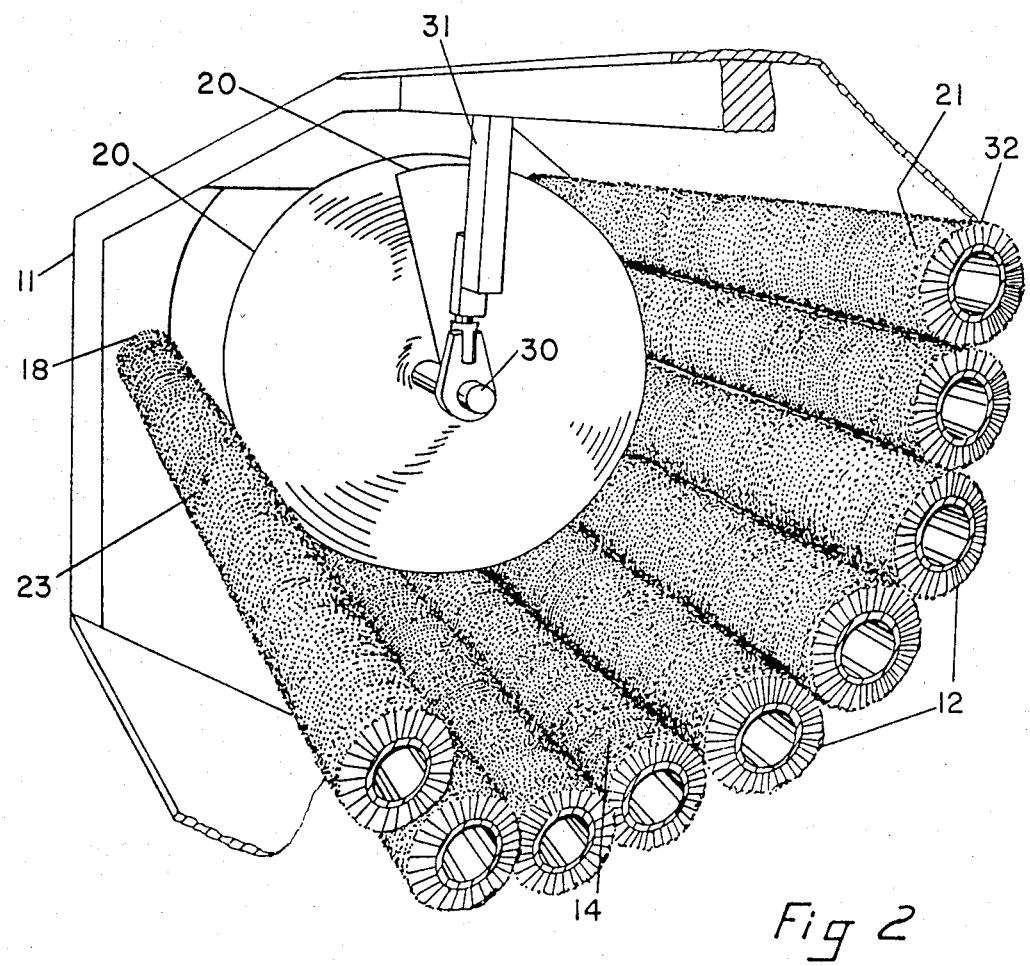
FIG. 2 is a perspective view of a broken away portion of the vegetable peeler of FIG. 1, showing the surfaces of the auger facing the intake end of the vegetable peeler.

Referring more particularly to the drawings, wherein like numbers refer to like parts, FIG. 1 shows a vegetable peeler, generally indicated at 10, constructed in accord with the present invention. The vegetable peeler 10 has a frame 11 and a multiplicity of rollers 12 mounted on the frame in rotating relation. The rollers 12 extend parallel and adjacent to each other and are so arranged as to form a longitudinally extended, upwardly opening, U-shaped trough 14 defined by the rollers. Succeeding rollers 12 are mounted close enough together that the vegetables to be peeled cannot readily slip between the rollers and fall free of the trough 14. The trough 14 has an intake end 16 and a discharge end 18. For purposes of description, the entire vegetable peeler 10 and all its parts shall be referred to as having intake and discharge ends corresponding to the intake and discharge end 16, 18 of the trough 14.

A discharge auger 20 extends into the trough 14 a selected distance less than the overall length of the trough. The discharge auger 20 is rotatably mounted on the frame 11 with the longitudinal axis of the auger held parallel to the longitudinal axes of the rollers 12. The discharge auger 20 is adapted to turn at a selected rate of rotation while the rollers 12 are in operation so as to discharge from the discharge end 18 of the trough 14 vegetables held in the trough that are sufficiently toward the discharge end as to be engaged by the auger.

Each roller 12 has an abrasive roller surface 21 substantially covering the entire roller. Thus, the inwardly presenting surfaces of the trough 14 are all abrasive and, as the rollers 12 turn, rub and abrade the surfaces of vegetables placed therein. Means are provided for causing vegetables loaded into the trough 14 at the intake end 16 thereof to migrate toward the discharge end 18 where they may be engaged by the discharge auger 20. As the preferred embodiment of such means, the abrasive roller surface 21 of the rollers includes a multiplicity of radially extending, resilient bristles 23 canted slightly toward the discharge end 18. When a vegetable is pushed against the bristles 23, they rebound to nudge the vegetable toward the discharge end. Abrasive roller surfaces 21 alternative to the bristles 23 include a variety of roughened and other tearing and cutting surfaces familiar to one skilled in the art. With such surfaces, the means for causing vegetables loaded into the trough 14 to migrate toward the discharge end 18 may include means for elevating the intake end 16 of the trough relative to the discharge end. All such alternatives are within the scope and spirit of the invention.

An intake chute 22 is attached to the frame 11 at the intake end of the peeler 10 and extends from the intake end 16 of the trough 14 outwardly beyond the trough for a selected distance to provide for the convenient loading of the trough. A discharge chute 24 is attached to the frame 11 at the discharge end 18 of the trough 14 and is adapted to direct vegetables exiting the vegetable peeler 10 at its discharge end to a waiting container, conveyor, or other machine being utilized in the vegetable processing procedure.

Each roller 12 and the discharge auger 20 are individually driven, preferably by hydraulic roller motors 26 and a hydraulic auger motor 28, respectively. The roller and discharge auger motors 26, 28 are attached to the frame 11 and are engaged with the rollers 12 and discharge auger 20 respectively. The motors 26 and 28 are driven by a flow of fluid from a conventional pump (not shown) through hoses 27, shown broken away in the Figures. Preferably the pump is mounted at a convenient location remote from the vegetable peeler 10. The speed of each of the motors 26, 28 may be varied and controlled by controlling the flow of the fluid directed to it.

Conventional vegetable peelers typically are powered by at least one electrical motor located at one end of the trough of rollers. The rollers are then driven by means of any of a variety of gear or chain drives that are conventionally mounted on the ends of the rollers. As a consequence, conventional peelers must incorporate within them the considerable size and bulk of such motors and drive systems. The result is a considerably longer machine than would be necessitated solely by the trough of rollers. In addition, such drive systems and motors must be carefully sealed and protected from the water and vegetable material that is drained or thrown from the machine as it operates.

In contrast, the hydraulic motors of the invention are compact. Such conventional vegetable peelers as employ hydraulic motors generally comparable to the roller motors 26 of the invention have the pump used as a source of hydraulic pressure mounted on the end of the peeler in a location comparable to that of the electric motors and drive systems referred to above. However, in the vegetable peeler 10 of the invention, the source of hydraulic pressure necessary to run the motors 26, 28 is not located on the vegetable peeler 10. Instead, the pump unit or other conventional source of hydraulic pressure is mounted on a wall or rack separate from the vegetable peeler 10 and connected to it only by hoses 27 that may be conveniently routed so as to not obstruct use of the vegetable peeler. Similarly, the hydraulic auger motor 28 may be compact, sealed, and powered by the same remote source of hydraulic pressure. As a consequence of this arrangement, the vegetable peeler 10 of the invention may be constructed having a length substantially the same as a conventional vegetable peeler and thus be capable of readily replacing such a conventional vegetable peeler in an existing vegetable processing line. However, a greater proportion of the length of the peeler of the invention may be devoted to the trough 14 of rollers 12 than is possible in a conventional peeler having an end mounted power source, motor, and drive system. By this means, the use of floor space within a food processing plant is made more efficient.

The particular means by which the discharge auger 20 is mounted within the vegetable peeler 10 of the invention is believed to be important to the efficient operation of the vegetable peeler. The discharge auger 20 is mounted on an auger shaft 30 that extends into the trough 14 for a selected distance and that in turn is mounted rotatably to the frame 11, oriented parallel to the longitudinal axes of the rollers 12. Preferably the auger shaft 30 is supported from above by two auger shaft supports 31. The auger shaft supports 31 are attached to each end of the auger shaft 30 by means of a suitable bearing and are attached to the frame 11 at locations immediately above the auger shaft. Preferably the rollers 12 are approximately 80 inches long. With rollers 12 of that length, an auger is used that extends approximately 12 inches into the discharge end 18 of the trough 14. Preferably the auger is a helical screw having one and one-half complete turns. The auger shaft 30 is adapted to extend into the discharge end 18 of the trough 14 only as far beyond the furthest extension of the auger 20 as is necessary for the practical and secure support of the auger shaft. Thus, it is preferred that not less than approximately 85% of the length of the rollers 12, and therefore of the trough 14 defined by the rollers, is entirely unobstructed either by an auger, auger shaft, or any other movable or fixed structure. In any event at least 70% of the trough 14 should be so unobstructed.

As a consequence of the structure of the auger 20 and auger shaft 30 disclosed above, the mass of vegetables to be peeled that may be held in the trough 14 without interaction with the auger shaft or the auger may be deeper than otherwise would be possible had either extended further into the trough. Preferably, the sides of the trough 14, as defined by the rollers 12, extend at least as high on either side of the auger 20 as the longitudinal axis of the auger. Preferably, one side of the trough 14, hereinafter referred to as the high side 32 of the trough, extends upwardly beyond the level of the longitudinal axis of the auger 20 for a selected distance, as is most easily observed in FIG. 4. The rollers 12 preferably turn all the same way and specifically in such a direction that a vegetable to be peeled held within a trough 14 is impelled toward the high side 32. As a consequence, a mass of vegetables to be peeled tends to be driven up the high side 32 of the trough 14 and to tumble back on itself from the high side toward the remaining side of the trough. Such a mass of vegetables, then, is highest on the high side 32 of the trough 14, as is depicted in the mass of vegetables shown in phantom in FIG. 4 at 34. The speed at which the discharge auger 20 turns may be adjusted to provide some resistance to the free flow of vegetables through to the trough 14. As a consequence, the trough 14 may be filled to a greater depth than otherwise would be possible. Vegetables in the unobstructed portion of the trough 14 can tumble freely, with the mass of vegetables constantly pressing vegetables that are in contact with the rollers 12 tightly against the abrasive roller surfaces 21 thereof.

The auger 20 is adapted to turn in the same direction as the mass of vegetables tends to tumble. Consequently, contact between the mass of vegetables and the auger 20 does not retard or interfere with the smooth tumbling of the vegetables, as would be the case if a stationary obstruction or gate were used such as that used in the Vanmark peeler described above. Furthermore, because the auger 20 extends into the trough 14, the discharge of vegetables therefrom may be precisely metered with no possibility of some vegetables becoming trapped against such a stationary obstruction and being subjected to overpeeling.

It is disclosed above that, for a vegetable peeler of a given size, the length of the rollers 12 in the vegetable peeler 10 of the invention can be longer than the rollers of a conventional vegetable peeler with an end-mounted motor and drive mechanism. In practice, an additional roller length of approximately 10 inches typically is obtained. It has also been found desirable to increase the size of the trough 14 laterally. The trough 14 substantially defines a part of a circle, and the effective radius of the trough 14 of the vegetable peeler 10 of the invention is increased by approximately 4 inches over the comparable radius of the corresponding trough of the Vanmark vegetable peeler referred to above, the size of the Vanmark peeler being typical of conventional peelers. To accomplish this increase in size, at least nine rollers 12 are employed, each having a diameter of approximately five and three-eighths inches. The resulting inside radius of the circle defined by the rollers is roughly twelve inches. Thus the maximum depth of the mass of vegetables that can be processed in the trough 14 is approximately twelve inches as opposed to the eight-inch depth attainable in the typical conventional peeler, such as the Vanmark peeler. The increased maximum depth results in an increase in the pressure with which vegetables are pressed against the abrasive surface 21 of the rollers 12 at that depth.

When a vegetable peeler 10 is compared to a Vanmark machine of the sort referred to above that occupies approximately the same amount of floor space, the increases in size disclosed result in an approximately 36% increase in the area of the abrasive roller surface 21 with which vegetables within the vegetable peeler 10 may come into contact. However, in a test situation the capacity of the vegetable peeler 10 of the invention was found to be increased over that of the Vanmark machine by an amount much in excess of 36%. A vegetable peeler made in accord with the disclosure contained herein was inserted in a potato peeling production line in which pre-steamed potatoes were peeled. Three Vanmark machines were being employed in the production line for the purposes of peeling the potatoes. Upon trial, it was found that one vegetable peeler 10 constructed in accord with the disclosure above was sufficient to replace all three of the Vanmark machines. Thus, the differences in structure and size incorporated in the peeler 10 made in accord with the invention accounted for an increase of capacity over the Vanmark machine of as much as 300%, a capacity comparable to or in excess of that of the Magnupeeler, discussed above.

It is not known what the exact contributions are of the disclosed differences in size and structure of the vegetable peeler 10 when compared to the Vanmark peeler and the comparable conventional peelers referred to above. It is believed that a maximum depth of vegetables in the trough 14 of not less than ten to twelve inches contributes to the capacity of the machine to a degree not in simple proportion to the depth or the resulting increase in the area of the abrasive roller surface 21 available to abrade the vegetables. Similarly, the increase in the proportion of the roller 12 length to the overall length of the vegetable peeler 10 is believed to be an advantage independent of the other disclosed features of the vegetable peeler, but it is not known exactly what part is played by this difference from the prior art in the surprising increase of capacity observed. Likewise, the structure and location of the discharge auger 20 and the mounting means for mounting it so as to leave a substantial portion of the trough 14 unobstructed by the auger shaft 30 is believed to contribute importantly to the increased capacity of the vegetable peeler 10, independent of the contributions of the remaining features and structure referred to.

It is understood that the present invention is not limited to the particular construction and arrangement of parts illustrated and disclosed herein. Instead, it embraces all such modified forms thereof as come within the scope of the following claims.

What is claimed is:

1. A vegetable peeler for peeling large quantities of vegetables comprising:
   (a) a frame;
   (b) a plurality of rollers rotatably attached to the frame in parallel relation to define a longitudinally extending, substantially horizontal, upwardly opening trough, the trough having sides, an intake end at which vegetables may be introduced into the trough, and a discharge end from which peeled vegetables may be discharged from the trough;
   (c) roller rotating means for rotating the rollers about their longitudinal axes;
   (d) a discharge auger extending longitudinally within the trough from the discharge end thereof parallel to the longitudinal axes of the rollers for a selected distance less than the entire length of the trough, the sides of the trough extending upwardly on either side of the auger at least as high as the longitudinal axis thereof;
   (e) mounting means for rotatably mounting the auger on the frame, the mounting means being adapted to leave a portion of the trough between the auger and the intake end substantially unobstructed, whereby the trough may receive an amount of vegetables placed therein for peeling, even if the amount is sufficiently large that the vegetables fill the trough at least as high as the longitudinal axis of the auger, without any interference to the free tumbling and other movement of the vegetables in the unobstructed portion of the trough; and
   (f) auger rotating means for rotating the auger at a selected speed about its longitudinal axis.

2. The vegetable peeler of claim 1 wherein the unobstructed portion of the trough includes at least 70% of the length of the rollers.

3. The vegetable peeler of claim 1 in which the roller rotating means includes hydraulic roller motors mounted on the frame and engaged with the ends of the rollers to turn the rollers, the hydraulic roller motors being adapted to be driven by a remote source of hydraulic pressure, whereby an increased percentage of the length of the vegetable peeler may be occupied by the trough.

4. The vegetable peeler of claim 1 wherein the trough has a depth selected to be sufficient to contain a mass of vegetables to be peeled having a maximum depth not less than 10 inches.

5. A vegetable peeler for peeling large quantities of vegetables comprising:
   (a) a frame;
   (b) a plurality of rollers rotatably attached to the frame in parallel relation to define a longitudinally extending, substantially horizontal, upwardly opening trough, the trough having sides, an intake end at which vegetables may be introduced into the trough, and a discharge end from which peeled vegetables may be discharged from the trough;
   (c) roller rotating means for rotating the rollers about their longitudinal axes including hydraulic roller motors mounted on the frame and engaged with the ends of the rollers to turn the rollers, the hydraulic roller motors being adapted to be driven by a remote source of hydraulic pressure;
   (d) a discharge auger extending longitudinally within the trough from the discharge end thereof parallel to the longitudinal axes of the rollers for a selected distance not more than 30% of the entire length of the trough, the sides of the trough extending upwardly on either side of the auger at least as high as the longitudinal axis thereof;
   (e) mounting means for rotatably mounting the auger on the frame, the mounting means being adapted to leave a portion of the trough between the auger and the intake end substantially unobstructed, whereby the trough may receive an amount of vegetables placed therein for peeling, even if the amount is sufficiently large that the vegetables fill the trough at least as high as the longitudinal axis of the auger, without any interference to the free tumbling and other movement of the vegetables in the unobstructed portion of the trough; and
   (f) auger rotating means for rotating the auger at a selected speed about its longitudinal axis.

6. The vegetable peeler of claim 5 wherein the trough has a depth selected to be sufficient to contain a mass of vegetables to be peeled having a maximum depth not less than 10 inches.

* * * * *